United States Patent [19]

Schneider

[11] Patent Number: 4,484,903
[45] Date of Patent: Nov. 27, 1984

[54] DRIVE BELT OF TRAPEZOIDAL CROSS-SECTION

[75] Inventor: André Schneider, St. Hyppolyte, France

[73] Assignee: Compagnie Generale des Etablissements Michelin, Clermont-Ferrand, France

[21] Appl. No.: 496,184

[22] Filed: May 19, 1983

[30] Foreign Application Priority Data

Jun. 1, 1982 [FR] France ............................ 82 09629
Nov. 18, 1982 [FR] France ............................ 82 19479

[51] Int. Cl.³ .............................................. F16G 5/16
[52] U.S. Cl. ................................. 474/242; 474/201; 474/265
[58] Field of Search ............... 474/242, 244, 201, 237, 474/265, 245, 238, 248, 272, 268, 240, 252; 198/847

[56] References Cited

U.S. PATENT DOCUMENTS 4,338,081 7/1982 Hattori et al. ...................... 474/201
4,371,361 2/1983 Giacosa ........................... 474/242 X
4,386,921 6/1983 Roberts ........................... 474/242 X

FOREIGN PATENT DOCUMENTS 2414989 10/1975 Fed. Rep. of Germany ............ 474/
256918 9/1948 Switzerland .............................. 474/

Primary Examiner—Stephen J. Novosad
Assistant Examiner—Thuy M. Bui
Attorney, Agent, or Firm—Brumbaugh, Graves, Donohue & Raymond

[57] ABSTRACT

A drive belt of trapezoidal cross-section is formed of a core comprising a longitudinal rib and of an assembly of independent riders which are substantially non-compressible in longitudinal direction, are mounted on the core and have a portion of a cutout corresponding to the rib of the core.

13 Claims, 9 Drawing Figures

DRIVE BELT OF TRAPEZOIDAL CROSS-SECTION

BACKGROUND OF THE INVENTION

The present invention relates to drive belts whose cross-section has a substantially trapezoidal outer contour and which are formed essentially of at least one core closed on itself and of an assembly of riders mounted alongside each other on the core.

Such belts are used, for instance, in certain speed regulators which act by the spreading apart of conical-flange pulleys. In these regulators the drive torque is transmitted by compression of the riders against each other between the flanges of the pulleys and along the flattened annular core. Longitudinal sliding takes place between the core and the riders. In order to permit this movement, clearance is provided between the two side faces and the outer face of the core, on the one hand, and the riders, on the other hand. The inner face of the core remains frequently in contact with the riders, particularly in the regions where the belt is engaged between the flanges of the pulleys. These clearances permit a transverse backward and forward movement of the core with respect to the riders. These relative movements result in rubbing, heating and wear of the inner face and of the two side faces of the core.

The technique of the manufacture of the core (which is a flat belt) makes it possible to minimize the wear of the inner face of the core. However, the protection of the side faces requires individual treatment of each core, for instance, by covering the core with a protective fabric which adheres to the core.

The object of the invention is to eliminate the individual protection of the side faces of the core at the time of the manufacture thereof, while avoiding the relative backward and forward movement of the core within the riders, this movement being the major cause of the wear of the side faces of the core.

Thus, the invention consists in providing at least on one of the inner or outer faces of the core at least one longitudinal rib which is permanently housed within a corresponding portion of a cutout in each rider. This rib is preferably continuous.

The invention is advantageously combined with one of the following arrangements. They, on the one hand, further decrease the destructive friction and therefore the heating of the parts which move relative to each other and, on the other hand, reduce the noise, and furthermore, in the case of the last two, make it possible also to separate the transverse guidance function from the drive function of the movement of the riders.

In a second variant, the core is essentially formed of a reinforced or non-reinforced rubber or plastic material; the riders are essentially formed of metal; the rib of the core, at least in the portion thereof in contact with the corresponding portion of the cutout in each rider, is formed of a rubber or plastic material of high resistance to compression and wear; and the outer faces of the riders, at least in the portions thereof in contact with the pulley flanges, are formed of a rubber or plastic material of high resistance to compression and wear in contact with the metal of the pulley flanges.

In a third variant, the core is essentially formed of a reinforced or non-reinforced rubber or plastic material; each rider is formed of two longitudinally consecutive elements which are locked with respect to each other in the transverse direction of the belt; the first element is spaced from the core, has its outer faces in contact with the pulley flanges and, at least at its outer faces, is formed of a rubber or plastic material of high resistance to compression and wear in contact with the metal of the pulley flanges; the second element is spaced from the pulley flanges, comprises the cutout which houses the rib of the core and, at least along the cutout, is formed of metal; and the rib of the core, at least in the portion thereof in contact with the second element of the riders, is formed of a rubber or plastic material of high resistance to compression and wear in contact with the metal of the second element.

Finally, in a fourth variant, the first element of the riders is formed of a rubber or plastic material of high resistance to compression and wear in contact with the metal of the pulley flanges; the second element is formed of metal; and the rib of the core is formed of a rubber or plastic of high resistance to compression and wear in contact with the metal of the second element.

These riders are preferably arranged one behind the other on the core so that the first elements alternate with the second elements.

Embodiments of the invention are described in the following description given with reference to the figures of the drawing in which:

FIGS. 5, 7 and 8 show cross-sections, while

Figure 1:
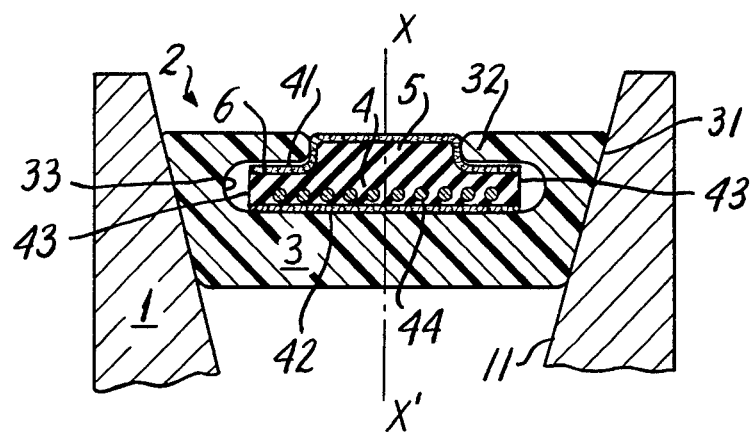
FIG. 1 shows the cross-section of a belt in accordance with the invention wherein the core is provided on its outer face with a centering rib which is equidistant from the side faces of the core and which fits within the mounting opening of the riders.
Figure 2:
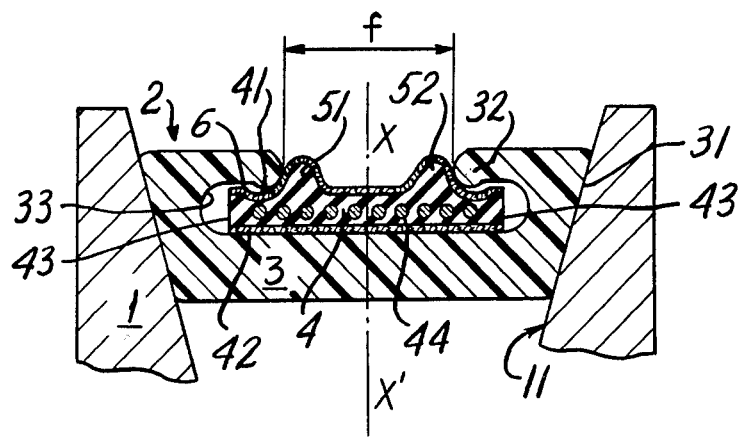
FIG. 2 shows the cross-section of a belt in accordance with the invention wherein the core is provided on its outer face with two ribs which are equidistant from the two side faces of the core and which fit within the mounting opening of the riders.
Figure 3:
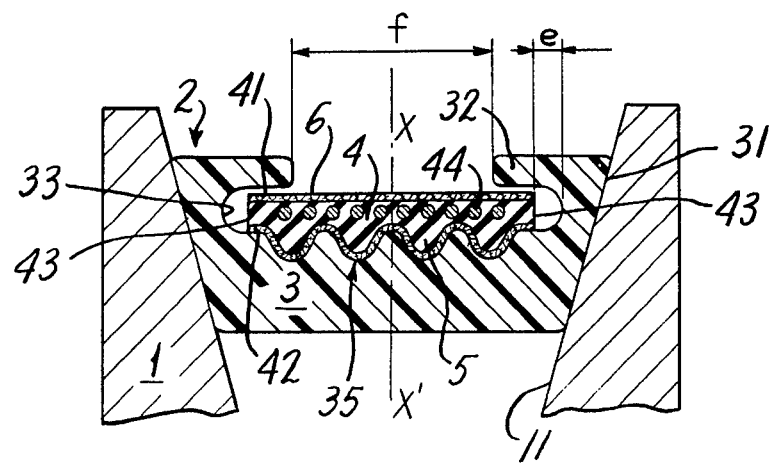
FIG. 3 shows the cross-section of a belt in accordance with the invention wherein the core is provided on its inner face with four ribs which fit in corresponding grooves on the face of the riders in contact with the inner face of the core.

FIGS. 1 to 3 show a partial cross-section through a pulley 1 having conical flanges 11 within which pulley there is a drive belt 2 in accordance with the invention formed essentially of riders 3 mounted on a core 4. The core 4, which is of essentially rectangular cross-section flattened in the transverse direction, comprises an outer face 41, an inner face 42 in contact with the riders 3, and two side faces 43 equidistant from the axis of symmetry XX' of the pulley 1, which is also the median line of the two side faces 43. The core 4 may furthermore comprise, for instance, longitudinal reinforcement 44. The outside faces 31 of the riders 3 are inclined with respect to each other so as to apply themselves as a wedge against the conical flanges 11 of the pulley 1. Furthermore, the riders 3 have a horseshoe-shaped cross-section forming a cutout, the two end branches 32 of which form a mounting opening which makes it possible to introduce the core 4 into the riders 3 at the time of the assembling of the belt 2.

In accordance with a first variant of the invention, the outer face 41 of the core 4 of FIG. 1 has a continuous longitudinal rib 5 which is equidistant from the two side faces 43 of the core 4. The rib 5 is housed within the corresponding mounting opening portion of the cutout formed by the two end branches 32 of the riders 3. Thus the rib 5 prevents the core 4 from moving transversely, that is to say, parallel to the axis of rotation (not shown) of the pulley 1 with respect to the riders 3. This makes it possible to obtain a relatively high constant clearance between the side faces 43 of the core 4 and the corresponding inside wall 33 of the riders 3, which clearance, in the absence of transverse, backward and forward movements, prevents the rubbing of the side faces 43 of the core 4 against the inside wall 33 of the riders 3. This also has the result that the side faces 43 of the core 4 need not be provided with fabric or other surface-protecting means while the inner face 42 of the core 4 as well as the outer face 41 bearing the rib 5 are, in this example, provided with a surface protection canvas 6. Due to the invention, an assembly of several juxtaposed cores can be manufactured in a single piece on a cylindrical mold and the assembly then split lengthwise in order to obtain the individual cores having unprotected side faces.

A second variant is shown in FIG. 2. The core 4 has surface protection canvas 6 on its inner face 42 and on its outer face 41, identical to that of the core 4 of FIG. 1. On the other hand, the outer face 41 of the core 4 has, in accordance with the invention, two ribs 51 and 52 equally spaced from the side faces 43. Furthermore, the end branches 32 of the riders 3 rest in the rounding which connects each rib 51, 52 to the side faces 43 of the core 4. This permits better distribution of the rubbing of the riders 3 on the core 4.

A third variant, shown in FIG. 3, concerns a core 4 whose inner face 42 in contact with the riders 3 is provided with four ribs 5.

In accordance with the invention, these ribs 5, which are equally spaced in pairs from the side faces 43 of the core 4 fit within a corresponding grooved portion 35 of the cutout in the riders 3.

The variants shown in FIGS. 2 and 3 make it possible to enlarge the mounting opening portion of the cutout in the riders 3, that is to say, the transverse distance f between the end branches 32 of the riders 3. The invention not only makes it possible to select as desired the distance or clearance e between each side face 43 of the core 4 and the corresponding inside wall 33 of the riders 3, but also to impart to the inside wall 33 a rounded profile which makes it possible to deform the riders 3 without danger of rupture upon their mounting on the core 4, since, due to the invention, the side faces 43 of the core 4 are no longer brought to bear against the corresponding inside walls 33 of the riders 3.

The riders 3 preferably consist of plastic injection moldings. The reinforcement 44 of the core 4 may consist of any suitable material; the core 4 itself may be of vulcanized or thermoplastic elastomer or of cast or injected polyurethane, with outer protective layers 6 such as a frictionized or gummed cotton or polyamide twilled fabric.

Figure 4:
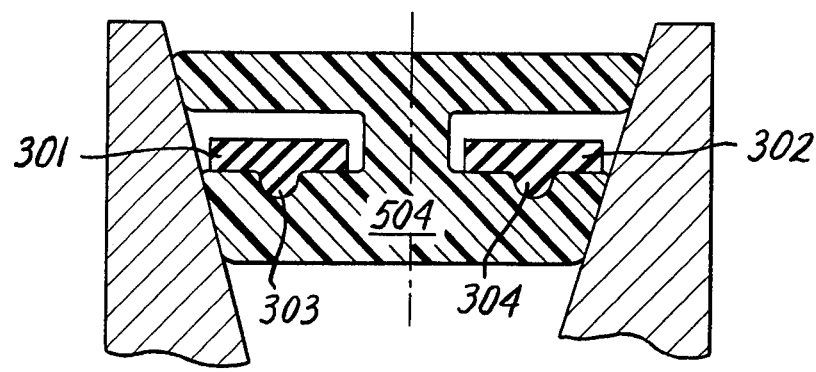
FIGS. 4 and 5 show cross-sections through variants having two cores.

FIG. 4 shows a cross-section through a belt in accordance with the invention having two cores 301 and 302. They are each provided, in accordance with the invention, with a rib 303, 304 on their inner faces which fit in a corresponding grooved portion of the cutout in the riders 504.

Figure 5:
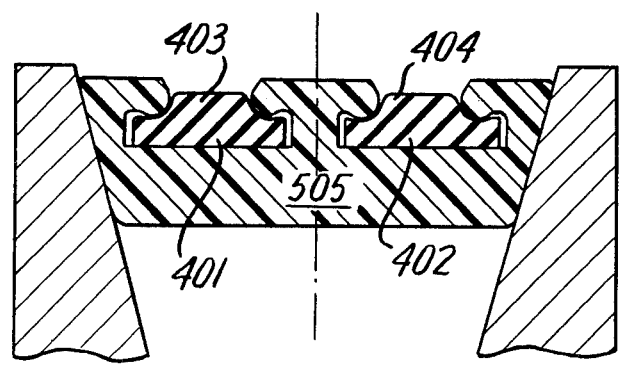

FIG. 5 shows a cross-section through a belt in accordance with the invention having two cores 401 and 402, each provided with a rib 403, 404 on their outer faces, each of the ribs fitting in a corresponding mounting opening portion of the cutout in the riders 505.

In the preferred variants shown in FIGS. 6, 7, 8 and 9, the following materials are combined to improve the pulley/rider contact: steel, cast iron and light alloys, on the one hand, and filled or unfilled thermoplastic or thermosetting resins, such as polyamides, polyacetals, polyimides, polyurethanes and vulcanized elastomers, on the other hand; and the following materials are combined in order to improve the rider/core contact: steel and light alloys, on the one hand, and filled or unfilled thermoplastic or thermosetting resins, such as polyamides, polyesters, polyurethanes, fluorinated polymers and vulcanized elastomers, possibly in the form of fibers, filaments or threads, on the other hand.

Figure 6:
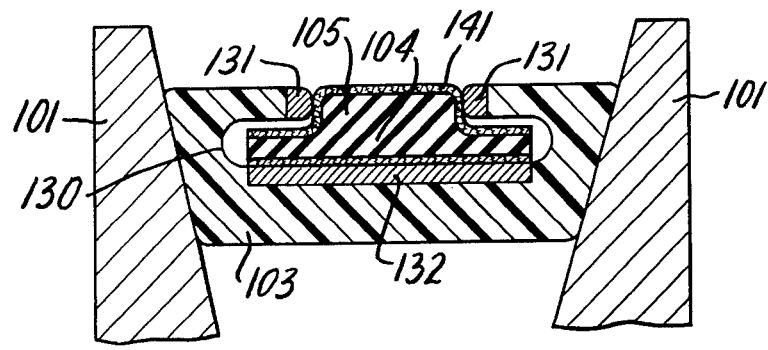

Thus the rider 103 of FIG. 6 which is in contact with the flanges of the pulley 101 is formed, in accordance with the first variant, of polyamide-6,6 except in the portion 131 of the end branches thereof, which is formed of metal (steel). In accordance with the invention, the portion 132 of the cutout 130 in the rider 103 in contact with the inner face of the core 104 is also formed of metal (steel).

The core 104 of the belt has on its outer face a rib 105 whose surface 141 in contact with the rider 103 consists of polyamide fabric.

Figure 7:
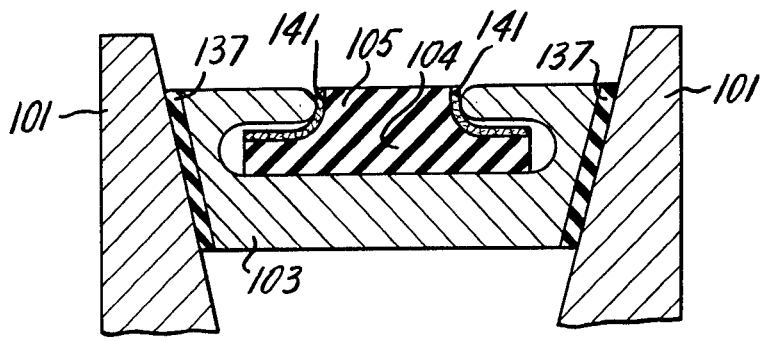

In accordance with the second variant, the rider 103 of FIG. 7 is formed of steel with the exception of its portions 137 in contact with the flanges of the pulley 101. These portions 137 are formed, for instance, of vulcanized rubber or polyurethane. The core 104 is provided with a centering rib 105. This rib 105 has a covering of polyamide fabric at least along the surfaces 141 which bear against the mounting opening portion of the cutout 130 in the rider 104.

Figure 8:
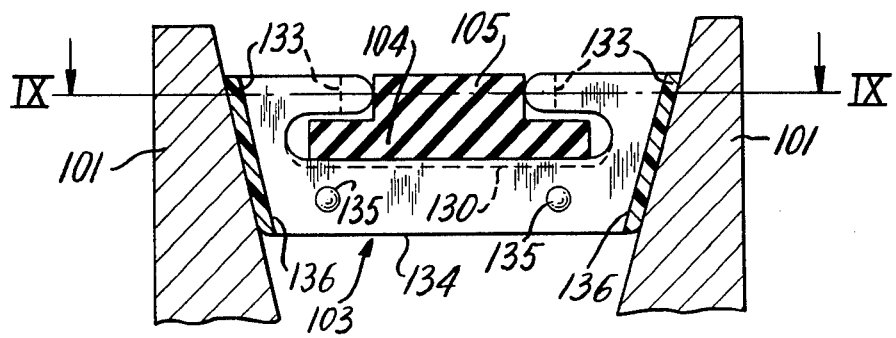
Figure 9:
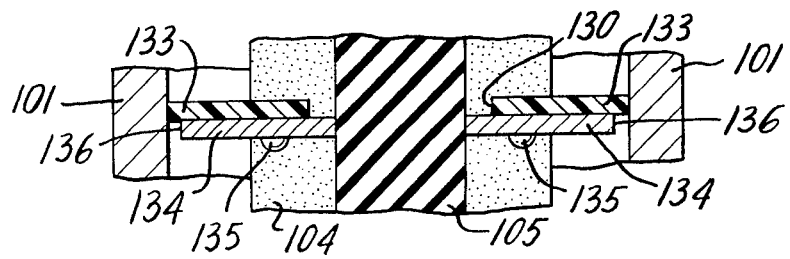
FIG. 9 is a longitudinal section of FIG. 8 along the plane IX—IX, through four preferred variants of the invention, comprising specific materials, as stated above.

FIG. 8 and FIG. 9 (longitudinal section of FIG. 8 along the plane IX—IX) show the sections of an arrangement developed in accordance with the third variant, a single rider 103 being shown.

The core 104 and its rib 105 are made of rubber covered on the outside, possibly, by a polyamide fabric.

The rider 103 is formed of two elements 133, 134 which are locked with respect to each other, at least in the transverse direction, by means of two protrusions 135 from the first element 133 which are positioned in corresponding recesses in the second element 134.

As shown in dashed line in FIG. 8, the first element 133, arranged behind the second element 134 in FIG. 9, is set back or spaced from the core 104 and is in contact with the flanges of the pulley 101. This first element 133 is produced by injection molding, entirely of polyamide-imide.

The second element 134 has its outer faces 136 set back or spaced from the flanges of the pulley 101 and is in contact with the rib 105 of the core 104. This element 134 is made entirely of metal, for instance, of light alloy.

Thus, in accordance with the invention, the first element 133 has a cutout 130 which is without any physical contact with the core 104, in the same manner as the second element 134 of the rider 103 is without any physical contact with the flanges of the pulley 101. The riders 103 are preferably arranged one behind the other on the core 104 so that the first elements 133 alternate with the second elements 134.

It is furthermore known from U.S. Pat. No. 4,338,081 to alternate riders of plastic with riders of metal. However, the cutouts of the two types of rider within which the core of the belt is housed are identical and the plastic riders do not touch the pulley flanges. The purpose of such an alternate arrangement of the riders is to make the belt lighter and to reduce the noise caused by the contact of the metal riders with each other.

What is claimed is:

1. A drive belt whose cross-section has a substantially trapezoidal outer contour and which is formed essentially of at least one core closed on itself and of an assembly of riders mounted alongside each other on the core in such a manner that the inner face of the core is in contact with the riders, characterized by the fact that on at least one of its inner or outer faces the core has at least one longitudinal rib permanently housed within a corresponding portion of a cutout in each rider.

2. A belt according to claim 1, characterized by the fact that the rib is continuous.

3. A belt according to claim 1 or 2, characterized by the fact that the rib is equidistant from the side faces of the core.

4. A belt according to claim 3, characterized by the fact that the rib is arranged on the outer face of the core and is housed within a corresponding mounting opening portion of the cutout in the riders.

5. A belt according to claim 1 or 2, characterized by the fact that the core has two ribs which are equidistant from the side faces of the core.

6. A belt according to claim 5, characterized by the fact that the ribs are arranged on the outer face of the core and are housed within a corresponding mounting opening portion of the cutout in the riders.

7. A belt according to claim 1, characterized by the fact that the core has at least one rib on its inner face.

8. A belt according to claim 1, characterized by the fact that the core has essentially a rectangular cross-section flattened in the transverse direction.

9. A belt according to claim 1, characterized by the fact that the core and the riders are essentially formed of a reinforced or non-reinforced rubber or plastic material; the corresponding portion of the cutout in each rider within which the rib of the core is housed is formed of metal; and the rib of the core, at least in the portion thereof in contact with the corresponding metal portion of the cutout in the rider, is formed of a rubber or plastic material of high resistance to compression and wear.

10. A belt according to claim 1, characterized by the fact that the core is essentially formed of a reinforced or non-reinforced rubber or plastic material; the riders are essentially formed of metal; the rib of the core, at least in the portion thereof in contact with the corresponding portion of the cutout in each rider, is formed of a rubber or plastic material of high resistance to compression and wear; and the outer faces of the riders, at least in the portions thereof in contact with the pulley flanges, are formed of a rubber or plastic material of high resistance to compression and wear in contact with the metal of the pulley flanges.

11. A belt according to claim 1, characterized by the fact that the core is essentially formed of a reinforced or non-reinforced rubber or plastic material; each rider is formed of two longitudinally consecutive elements which are locked with respect to each other in the transverse direction of the belt; the first element is spaced from the core, has its outer faces in contact with the pulley flanges and, at least at its outer faces, is formed of a rubber or plastic material of high resistance to compression and wear in contact with the metal of the pulley flanges; the second element is spaced from the pulley flanges, comprises the cutout which houses the rib of the core and, at least along the cutout, is formed of metal; and the rib of the core, at least in the portion thereof in contact with the second element of the riders, is formed of a rubber or plastic material of high resistance to compression and wear in contact with the metal of the second element.

12. A belt according to claim 11, characterized by the fact that the first element is formed of a rubber or plastic material of high resistance to compression and wear in contact with the metal of the pulley flanges; the second element is formed of metal; and the rib of the core is formed of a rubber or plastic material of high resistance to compression and wear in contact with the metal of the second element.

13. A belt according to claim 11 or 12, characterized by the fact that the riders are arranged one behind the other on the core so that the first elements alternate with the second elements.

* * * * *